US006996105B1

(12) United States Patent
Wilson

(10) Patent No.: US 6,996,105 B1
(45) Date of Patent: Feb. 7, 2006

(54) METHOD FOR PROCESSING DATA PACKET HEADERS

(75) Inventor: Andrew W. Wilson, Fremont, CA (US)

(73) Assignee: Adaptec, Inc., Milpitas, CA (US)

( * ) Notice: Subject to any disclaimer, the term of this patent is extended or adjusted under 35 U.S.C. 154(b) by 947 days.

(21) Appl. No.: 10/029,186

(22) Filed: Dec. 19, 2001

Related U.S. Application Data

(60) Provisional application No. 60/257,364, filed on Dec. 19, 2000.

(51) Int. Cl.
*H04I 12/28* (2006.01)

(52) U.S. Cl. ...................................... 370/392; 370/466

(58) Field of Classification Search ........ 370/229–235, 370/389, 390, 391, 392, 393, 383, 464, 465, 370/466, 467, 469, 471, 474
See application file for complete search history.

(56) References Cited

U.S. PATENT DOCUMENTS 6,272,400 B1 * 8/2001 Jankins et al. .............. 700/282
6,324,183 B1 * 11/2001 Miller et al. ................ 370/467
6,834,326 B1 * 12/2004 Wang et al. ................ 711/114
2002/0046289 A1 * 4/2002 Venkaraman et al. ....... 709/236

* cited by examiner

*Primary Examiner*—Dang Ton
*Assistant Examiner*—Phuc Tran
(74) *Attorney, Agent, or Firm*—Martine Penilla & Gencarella, LLP

(57) ABSTRACT

A method for processing data packets received at a computing system is provided. The method includes receiving a data packet and processing lower layer protocol headers of the data packet to expose overlying headers of the data packet. The overlying headers in a shared hardware component capable of executing header data for a transmission control protocol (TCP) communication and a storage transport protocol (STP) communication are processed. The header data for the TCP communication and the STP communication are positioned into standard header field locations. It is determined whether the data packet is from the TCP communication or the STP communication. If the data packet is from the TCP communication the processing of the overlying headers of the data packet separately in TCP processing is completed. If the data packet is from the STP communication, the processing of the overlying headers of the data packet separately in STP processing is completed.

19 Claims, 8 Drawing Sheets

METHOD FOR PROCESSING DATA PACKET HEADERS

CROSS REFERENCE To RELATED APPLICATIONS

This application claims priority from U.S. Provisional Patent Application No. 60/257,364, filed Dec. 19, 2000, and entitled "STORAGE AREA NETWORK OPTIMIZED TCP." The aforementioned application is herein incorporated by reference.

BACKGROUND OF THE INVENTION

1. Field of the Invention

This invention relates generally to communication protocols, and more particularly to highly flexible communication protocols for efficiently communicating data between networked computers and storage devices.

2. Description of the Related Art

The art of networking computers has evolved over the years to bring computer users a rich communication and data sharing experience. As is well known, the Internet has given rise to a new level of sophisticated communication technologies that enable users to share information and communicate via electronic mail with users all over the world. Typically, in the computing industry, data may be transferred over several different types of networks such as the Internet, Local Area Networks (LAN), Wide Area Networks (WAN), Storage Area Networks (SAN), etc. Generally, data transferred over these types of networks may involve utilization of data transfer protocols such as, for example, transmission control protocol (TCP) and an internet protocol (IP). Quite often, the protocols representative of the types of transfer protocols used over the Internet is commonly known as TCP/IP.

TCP/IP is a set of protocols developed to allow cooperating computers to share resources across a network. TCP (the "transmission control protocol") is responsible for breaking up a message into variable length segments, reassembling them at the other end, resending anything that gets lost, and putting things back in the right order. IP (the "internet protocol") is responsible for routing individual segments. Through use of the TCP, data that is sent over a network is broken up into little pieces for transmission and reassembled once the data reaches its destination. Data may be sent in the form such as, for example, data packets, etc. Each of the TCP data packets has a header that includes information utilized to identify and process the data packets. The format of TCP data packets are well known to one skilled in the art. Depending on the interface used, the TCP may break down data into a variety of data packet sizes such as 128 byte packets. The TCP includes its own information which allows the data to be reattached in the correct order as well as resending any data that happens to get "dropped" (data that is lost due to various reasons such as congestion over the network). IP routes the data packaged by the TCP to a destination such as a device within a network.

TCP/IP protocols may also be used to direct data flow and transfer in data storage systems over a network. For example, small computer system interface (SCSI) may be used over TCP/IP to store data over a network onto a SCSI peripheral device for storage. Therefore, TCP and IP are beginning to be used to facilitate data transfer over a network to and from a storage device. Typically TCP utilizes a form of congestion avoidance and control in an attempt to minimize congestion in bulk data movement. Unfortunately, TCP's attempt to minimize congestion while maintaining an optimal data transfer rate is not very successful.

As originally designed, the TCP protocol was intended to be a very fault tolerant protocol that could withstand catastrophic failures of the communication network. TCP was also designed with long range communication (which is commonly referred to as a Wide Area Network (WAN)) and messaging in mind. As a result, TCP is inherently a protocol that has high overhead for handling the communication of variable length segments. In addition, because TCP does not recover very quickly from dropped packets, TCP will typically keep track of the particular packet that is dropped and will request the sending host to send only the packet that was lost. While the lost packet is being identified by the sending host, the receiving host keeps all of the data that were received after the dropped packet. Therefore, large memory resources are kept utilized while the receiving host is waiting for the dropped packet to be resent. Therefore, in smaller network environments such as, for example, storage data communication systems, less complex protocols that recover more quickly from dropped packets is desired.

Such an alternative protocol is a storage transport protocol (STP) (also known as simple transport protocol) as described in U.S. patent application Ser. No. 09/490,630, entitled "Methods For Implementing An Ethernet Storage Protocol In Computer Networks." This patent application is hereby incorporated by reference. STP may be configured to eliminate the overhead and inefficiencies associated with other transport protocols, such as TCP. STP can enable more efficient transfers of data over a communication link, such as, for example, a local area network (LAN), a storage area network (SAN), etc. Communication can also occur over a larger network, such as the Internet with the additional implementation of the Internet Protocol (IP). Consequently, STP can either run on its own in a local environment or over IP. In a wide area network, it may also be beneficial to run STP over IP to enable communication over level 3 switches and/or routers. Therefore, the use of the STP system may provide additional data throughput over that of TCP systems. But, because STP utilizes different types of headers than TCP, there may be cases where incompatibility between communicating devices exists, especially if a device utilizing STP attempts to communicate with another device that is only TCP compatible. Therefore, to obtain optimal data transport over large and small networks, full STP hardware and TCP hardware is presently needed.

FIG. 1A shows a data packet processing hardware 10 with hardware TCP processing. The data packet processing hardware 10 includes a MAC processor 12 connected to an IP processor 14. The IP processor 14 is connected to both a TCP/IP circuitry 16 and an STP circuitry 18. Both the TCP circuitry 16 and the STP circuitry 18 are connected to a host memory 20. Regrettably, having full circuitry from multiple data transmission protocols result in larger than desired chips and create redundant data processing capabilities for most needs. Unfortunately, circuitry to processes TCP is not typically compatible with STP due to STP having headers that are not aligned with TCP's headers.

FIG. 1B shows a data packet processing hardware 10' with software TCP processing. The data packet processing hardware 10' includes a MAC processor 12 connected to an IP processor 14. The IP processor 14 is connected to both a TCP software processing 22 and an STP circuitry 18. Both the TCP software processing 22 and the STP circuitry 18 are connected to a host memory 20. Again, due to the need for separate TCP and STP packet processing, data processing capabilities for both STP and TCP are needed.

Therefore, the data processing hardware of FIG. 1A gets full TCP performance (if sufficient hardware capabilities are included) and saves Host CPU cycles, but at higher cost because of the redundant hardware data processing capabilities. In contrast, the data processing hardware of FIG. 1B avoids the redundant hardware but at lower performance and/or high utilization of Host CPU resources. To avoid any redundant hardware, the TCP would be done in software on the host processor. Depending on relative link and processor speeds, this could slow TCP performance, and in any event would significantly burden the host CPU.

Therefore, there is a need for a method of enabling usage of TCP for large communication networks and a protocol with a lower overhead for communication of data in a smaller network without requiring two complete protocol processing systems. In such a method, either protocol may be utilized depending on the data transmission environment.

SUMMARY OF THE INVENTION

Broadly speaking, the present invention fills these needs by aligning STP headers with TCP headers. This can enable usage of a single piece of hardware for certain STP and TCP data packet processing. It should be appreciated that the present invention can be implemented in numerous ways, including as a process, an apparatus, a system, a device, a method, or a computer readable medium. Several inventive embodiments of the present invention are described below.

A method for processing data packets received at a computing system is disclosed. The method includes receiving a data packet and processing lower layer protocol headers of the data packet to expose overlying headers of the data packet. The overlying headers are processed in a shared hardware component capable of executing header data for a transmission control protocol (TCP) communication and a storage transport protocol (STP) communication. The header data for the TCP communication and the STP communication are positioned into standard header field locations. It is determined whether the data packet is from the TCP communication or the STP communication. If the data packet is from the TCP communication the processing of the overlying headers of the data packet separately in TCP processing is completed. If the data packet is from the STP communication, the processing of the overlying headers of the data packet separately in STP processing is completed.

In another embodiment, a method for processing data packets received at a computing system, where the received data packets are received from a networked transmitting computing entity, is provided. The method includes receiving a data packet and processing lower layer protocol headers of the data packet to expose overlying headers of the data packet. The further includes processing the overlying headers in a shared hardware component capable of executing fully compatible header data for a transmission control protocol (TCP) communication and a storage transport protocol (STP) communication. The fully compatible header data for the TCP communication and the STP communication are positioned into standard header field locations. The method also includes processing the overlying headers in the shared hardware component capable of executing partially compatible header data for a transmission control protocol (TCP) communication and a storage transport protocol (STP) communication. The partially compatible header data for the TCP communication and the STP communication are positioned into the standard header field locations. The method further includes determining whether the data packet is from the TCP communication or the STP communication.

If the data packet is from the TCP communication, the processing of the overlying headers of the data packet separately in TCP processing is completed. If the data packet is from the STP communication, the processing of the overlying headers of the data packet separately in STP processing is completed.

In yet another embodiment, a method for processing data packets received at a computing system is provided. The method includes receiving a data packet and processing lower layer protocol headers of the data packet to expose overlying headers of the data packet. The overlying headers in a shared hardware component capable of executing header data for a transmission control protocol (TCP) communication and a storage transport protocol (STP) communication are processed. The header data for the TCP communication and the STP communication are positioned into standard header field locations. It is determined whether the data packet is from the TCP communication or the STP communication. If the data packet is from the TCP communication the processing of the overlying headers of the data packet separately in TCP processing is completed. If the data packet is from the STP communication, the processing of the overlying headers of the data packet separately in STP processing is completed. The method also includes transmitting the processed data packet to a buffer of the computing system after completing the processing of the overlying headers of the data packet in the STP processing or the TCP processing.

In another embodiment, a method for processing data packets of multiple formats is provided. The method includes processing a first format of data packet header for a first data transfer protocol where the first format has a first plurality of data fields. The method further includes processing a second format of data packet header for a second data transfer protocol where the second format has a second plurality of data fields and is aligned with the first plurality of data fields of the first format of data packet header. The certain ones of the first plurality of data fields and certain ones of the second plurality of data fields are processed with a shared hardware without additional hardware specific for the first data transfer protocol and the second data transfer protocol.

The advantages of the present invention are numerous. Most notably, the present invention includes a method of modifying an STP header section to be compatible with TCP header formats. Therefore, a shared hardware may process compatible data fields of both STP and TCP data packets. As a result, two complete implementations of the protocol processing hardware or software is not required because of shared processing ability of the compatible data fields. This enables the ability to optimally utilize both types of data packets to optimize data transmission capabilities.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, and like reference numerals designate like structural elements.

DETAILED DESCRIPTION OF THE PREFERRED EMBODIMENTS

An invention is described for aligning STP headers with TCP headers so a single hardware unit can be shared for both TCP and STP data packet processing in data transfer systems and Internet Protocol storage. It will be obvious, however, to one skilled in the art, that the present invention may be practiced without some or all of these specific details. In other instances, well known process operations have not been described in detail in order not to unnecessarily obscure the present invention.

Therefore, in general terms, the present invention includes a method of modifying an STP header section to be compatible with TCP header formats. In this way, a host receiving a data transmission may manage and utilize both TCP and STP data packets. This ability to utilize both types of data packets enables usage of STP data packets in a smaller network environment and at the same time use TCP data packets when communicating data over a large network. The ability to manage TCP and STP data packets may be achieved through usage of STP data packets with certain header sections with a configuration compatible with TCP header configuration.

Figure 1A:
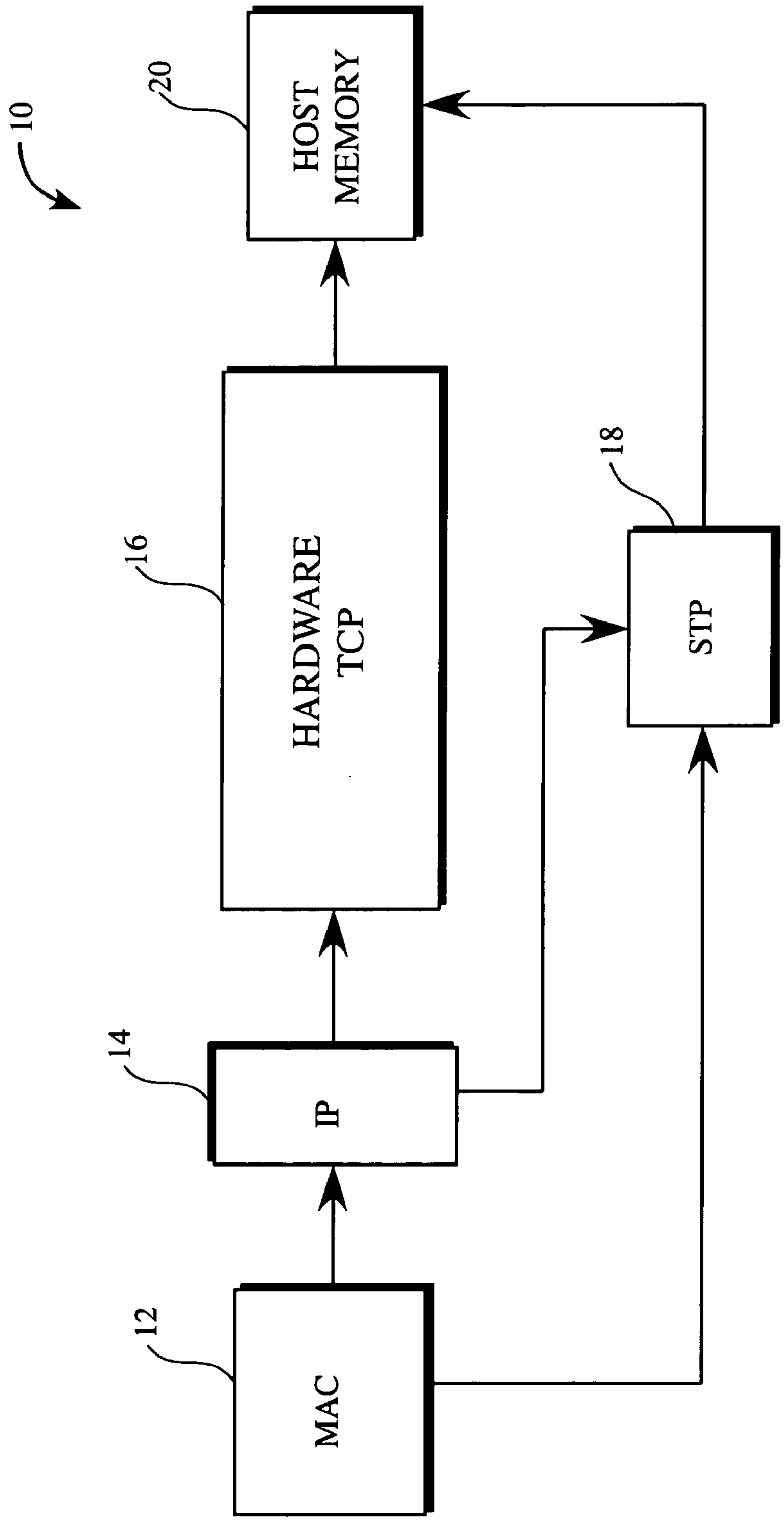
FIG. 1A shows a data packet processing hardware with hardware TCP processing.
Figure 1B:
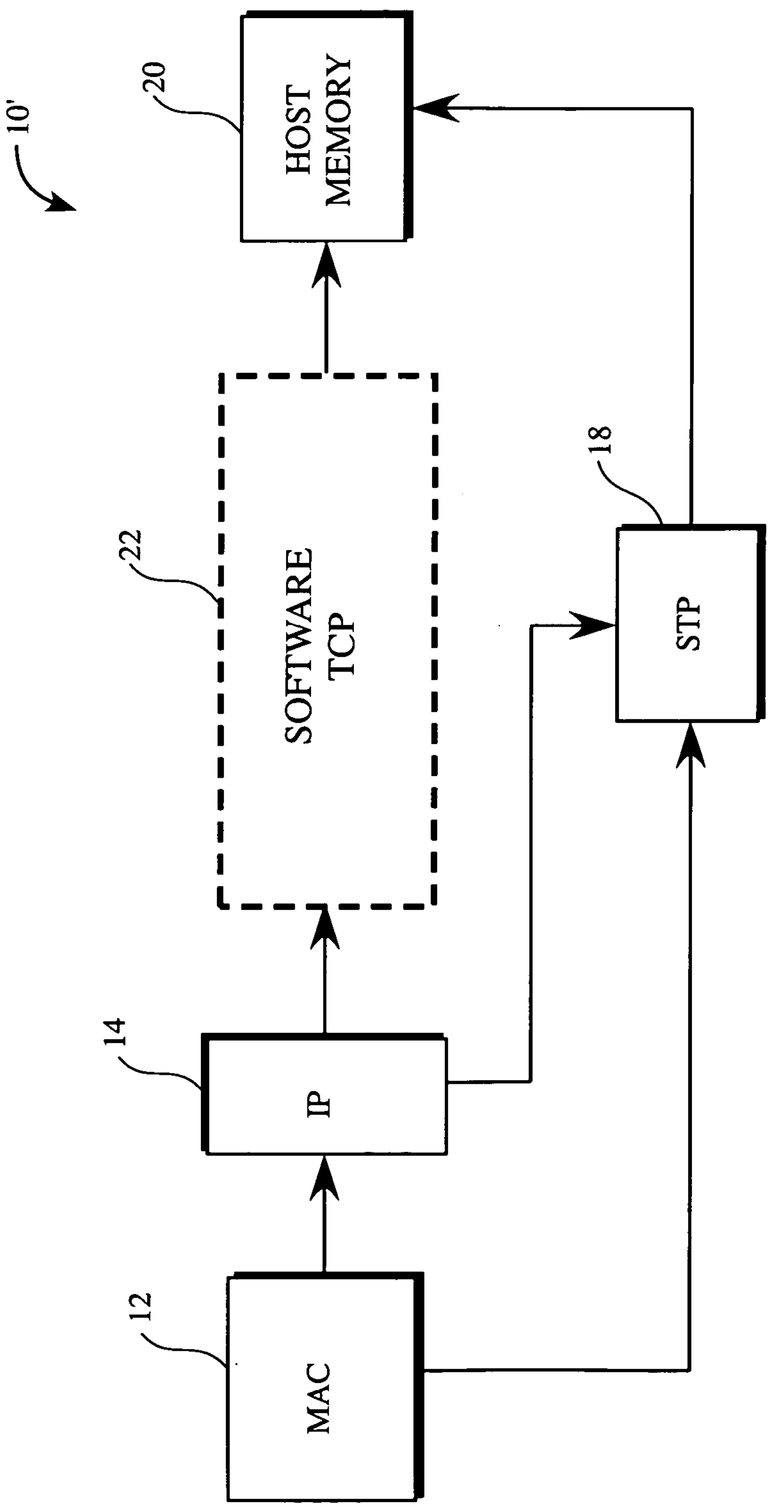
FIG. 1B shows a data packet processing hardware with software TCP processing.
Figure 2A:
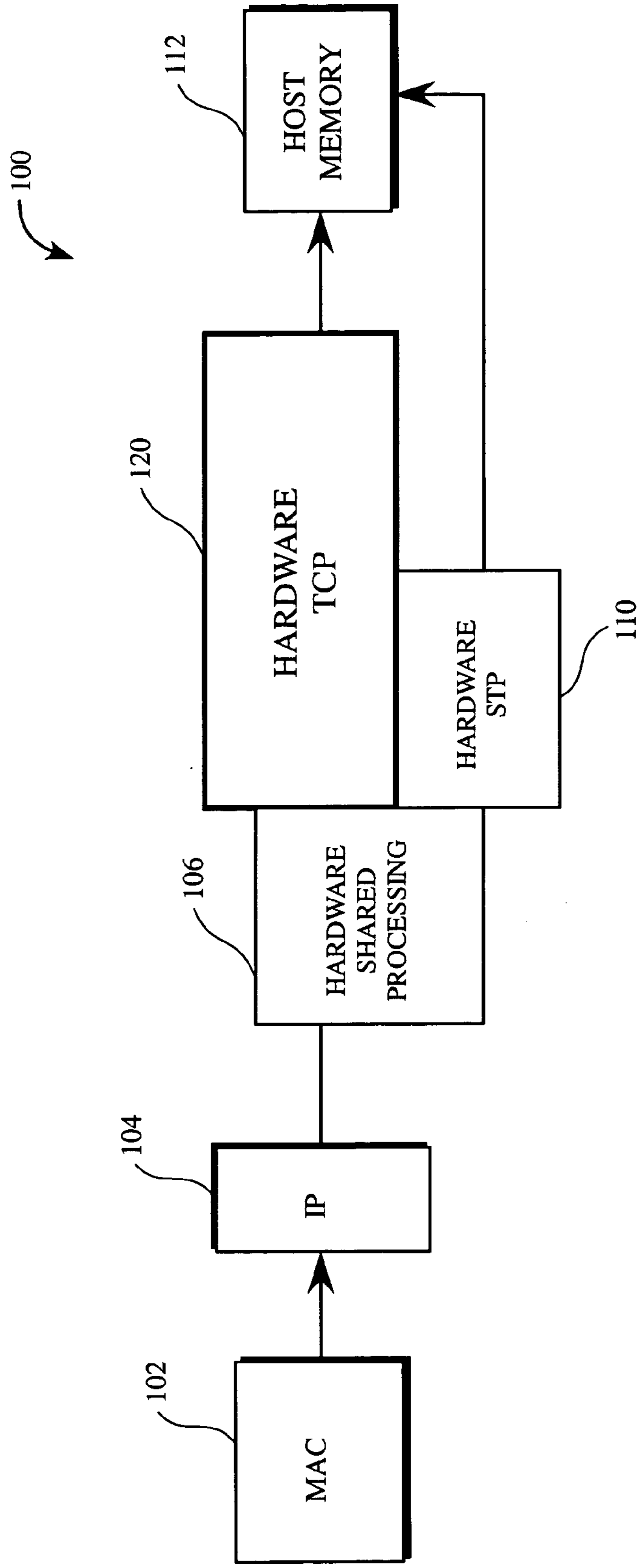
FIG. 2A shows a data transmission processing unit with shared hardware for shared TCP/STP processing with additional hardware TCP processing in accordance with one embodiment of the present invention.
Figure 2B:
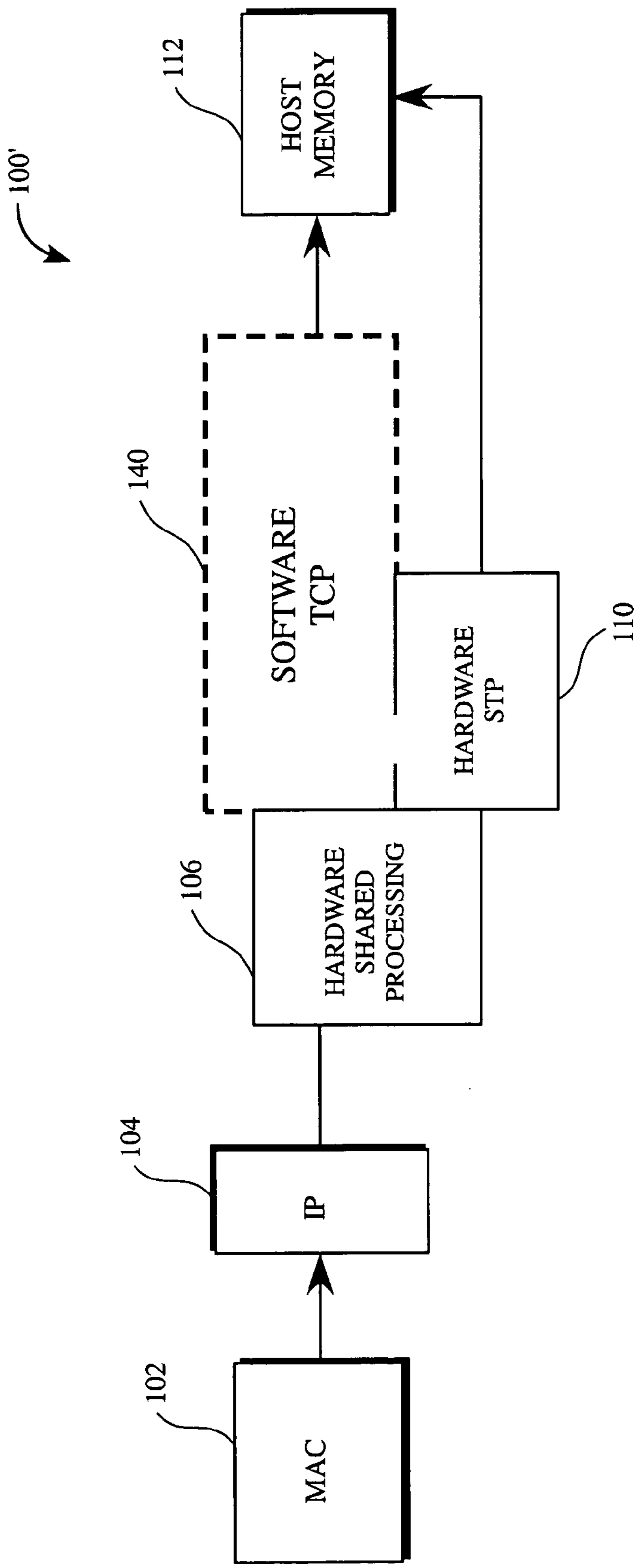
FIG. 2B shows a data transmission processing unit with circuitry for shared TCP/STP processing with additional software TCP processing in accordance with one embodiment of the present invention.

FIG. 2A shows one embodiment of the present invention where shared circuitry for partial TCP functionality and partial STP functionality is utilized where the TCP processing not available through the shared circuitry is done through additional hardware. Such a configuration is especially effective in larger network environments where full TCP functionality is required and there is local storage traffic that can benefit from STP. FIG. 2B shows an alternative embodiment, where a shared circuitry with STP and TCP processing is available through hardware but where the TCP processing is not available through the shared circuitry is done through software. Again, this configuration is very effective in data transmission environment in small network environment (e.g., data storage systems) where TCP is only needed for compatibility with non-STP capable devices or for the occasional long distance message.

For longer distance and compatibility with other vendor's SCSI over IP efforts, while still providing high performance where STP can be used, it is optimal to offer SCSI over both TCP and STP/IP. It should be understood that usage of an IP layer is optional in STP and hence IP processing in STP is optional. To enable maximum sharing of acceleration hardware, the headers for STP may be modified to more closely match those of TCP. In the following description, numerous specific details are set forth in order to provide a thorough understanding of the present invention. It will be understood, however, by one of ordinary skill in the art, that the present invention may be practiced without some or all of these specific details. In other instances, well known process operations have not been described in detail in order not to unnecessarily obscure the present invention.

FIG. 2A shows a data transmission processing unit 100 with shared hardware for shared TCP/STP processing with additional hardware TCP processing in accordance with one embodiment of the present invention. In this embodiment, the processing unit 100 shows a Media Access Control (MAC) header processing circuitry 102 with an internet protocol (IP) processing circuitry 104 for processing IP headers. The circuitry 102 and 104 therefore process lower layer protocol headers. Lower layer protocols headers as used herein includes the MAC header and optionally includes the IP header. It should be appreciated that processing through IP circuitry 104 is optional for STP packets which may or may not contain IP headers. The IP circuitry is coupled with a shared TCP/STP circuitry 106 which in turn may be coupled to TCP hardware 120 and STP hardware 110. The STP hardware 110 and the TCP hardware 120 are configured to process STP header fields and TCP header fields respectively not processed by the shared TCP/STP circuitry 106. Both the TCP hardware 120 and the STP hardware 110 is connected with a host memory 112. In one embodiment, the shared TCP/STP circuitry 106, the STP hardware 110, and the TCP hardware 120 may be physically connected in any suitable way that would enable shared TCP/STP processing (e.g., all circuitry on same chip, circuitry on different chips connected through hardware, etc.) The shared TCP/STP circuitry 106 can process data within certain TCP and STP header fields if the header fields of the two data transfer protocols are aligned (e.g., in the same location). By using the shared TCP/STP circuitry 120, redundant circuitry is not needed to process data within a particular header field for TCP and data in the corresponding header field in STP. As a result, the TCP hardware 120 may be smaller and less expensive than a TCP circuitry with full TCP capability. As discussed below in reference to FIGS. 4–7, by aligning TCP and STP headers, multiple types of data packet processing for STP and TCP may be conducted by a single hardware unit. A hardware unit as used herein may include, for example, hardware logic embodied in a semiconductor chip, programmable chip, or the like.

FIG. 2B shows a data transmission processing unit 100' with circuitry for shared TCP/STP processing with additional software TCP processing in accordance with one embodiment of the present invention. In this embodiment, the processing unit 100' shows the shared TCP/STP circuitry 106 being connected to software TCP 140 and the STP hardware. The STP hardware 110 and the software TCP 140 are configured to process STP header fields and TCP header fields respectively not processed by the shared TCP/STP circuitry 106. In one embodiment, the software TCP 140 is located in the host processor while the STP hardware 110 is on the same chip (as indicated above in FIG. 2A, any suitable type of configuration where the STP hardware 110 may work with the shared TCP/STP circuitry 106 is possible) as the shared TCP/STP circuitry 106. Therefore, the data transmission processing unit 100' may be smaller and less complicated due to usage of software TCP processing.

To be able to process both TCP data transmission packets as well as STP data packets, the headers of the STP data packets are desired to be compatible with TCP header format. Therefore, by using STP packets with TCP compatible headers, the configurations as shown above in reference to FIGS. 2A and 2B may be accomplished. As a result, usage of aligned fields in STP and TCP headers enable usage of shared hardware for processing data within the aligned fields thereby reducing usage of redundant circuitry and lowering hardware production and usage costs.

Figure 3A:
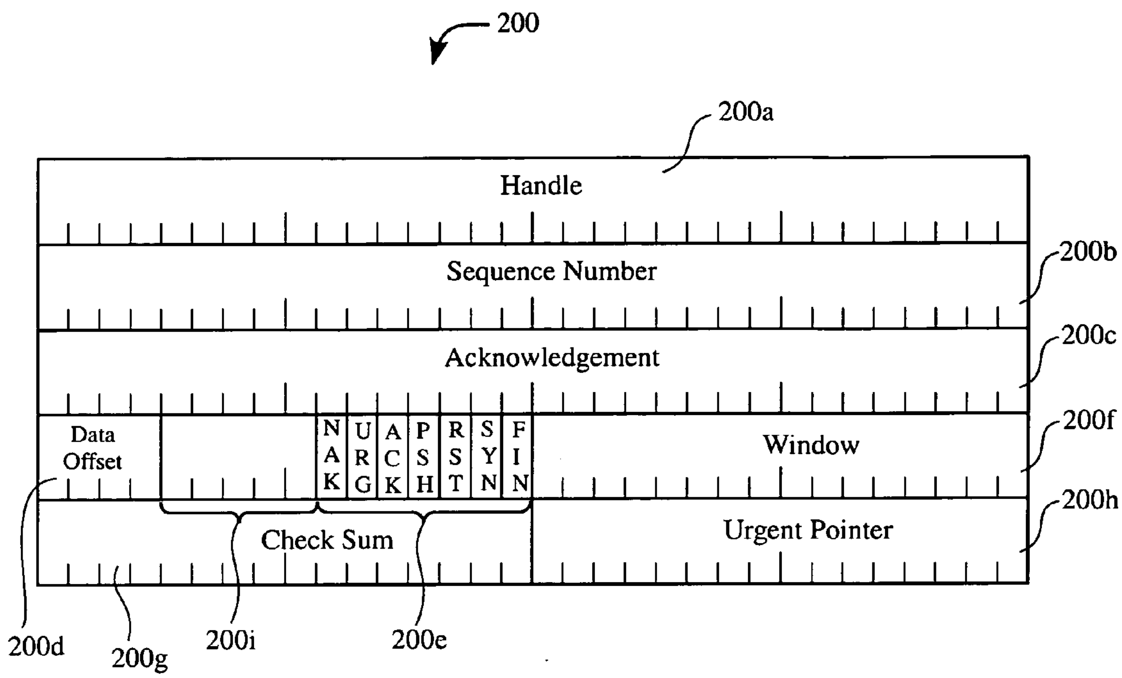
FIG. 3A illustrates an STP header with an arrangement that may achieve a match of functionality with TCP in accordance with one embodiment of the present invention.

FIG. 3A illustrates an STP header 200 with an arrangement that may achieve a match of functionality with TCP in accordance with one embodiment of the present invention. In this embodiment, the STP header 200 includes a handle field 200*a*, a sequence number field 200*b*, an acknowledgement field 200*c*, a data offset field 200*d*, a plurality of flags field 200*e*, a window field 200*f*, a checksum field 200*g*, an urgent pointer field 200*h*, and a reserved field 200*i*.

While this has some of the functionality of TCP headers, some fields are re-interpreted to match STP's requirements. The handle field 200*a* is STP's handle mechanism for directing packets to the correct session. This takes the place of TCP's source (SRC) and destination (DST) port numbers which do a corresponding function for TCP. Part of the handle may be picked so as to enable optimized look up at the destination, and part may be a random number to guard against new connections appearing to be "old" connections because of handle re-use.

The sequence number 200*b* is different than TCP in that packets are counted rather than bytes. Numbering packets instead of counting by bytes creates a much larger sequence space and allows safe operation in an IP environment (i.e. protection against "ghost" packets) at up to 10 Gigabit data rates. The acknowledgment field 200*c* has a sequence number of the last successively received, contiguous packet. (utilizes packets instead of bytes as TCP does). The data offset field 200*d* allows for options done uniquely with STP, but the data offset field 200*d* has the capability of be utilized as with TCP. It should be understood that the options field may be configured in any number of ways depending on the communications protocol to be utilized.

The flags field 200*e* can include any number or types of flags including flags known to one skilled in the art such as, for example, NAK, FIN, SYN, RST, PSH, ACK, URG. FIN means "No more data from sender." SYN means "syncrhonize sequence numbers." RST means "reset the connection." PSH means "push function." URG means "urgent pointer significant." ACK means "acknowledgement field significant." In this embodiment, NAK means that all packets with higher sequence numbers than the one in the Acknowledgement field may be retransmitted.

The window field 200*f* enables the receiver to apply some end-to-end flow control at the packet level. This field may be utilized to protect the Sockets buffers from overflowing. The checksum field 200*g* would be computed using TCP's checksum algorithm for STP as well as TCP. When used with STP, the checksum may cover a 32 bit STP trailing CRC, for full hardware compatibility with its use with TCP.

The urgent pointer 200*h* points to the first byte in the packet beyond the urgent data (which is typically at the front of the packet.). For EtherStorage (a.k.a. eSCSI), using an urgent ("URG") bit as an indication of an Upper Layer Protocol (ULP) header at the front of the packet may be sufficient. IP storage protocol "iSCSI" when combined with a transport protocol such as TCP or STP, provides similar functionality to that of EtherStorage. It should be appreciated that the methods described herein may also be applicable to iSCSI.

In addition to re-arranging the header fields, a couple of other options may be included. A "force ACK" bit similar to that used in XTP, a "congestion encountered" bit, and a limited selective NAK option can be included in the header fields. The "force ACK" bit may be toggled every time the transmitter wants to force the receiver to send an ACK. This is particularly useful when the traffic is mostly one direction at a time, as often happens in a storage application. In such situations, the piggy back ACK mechanism employed by STP may not facilitate timely arrival of acknowledgement information, so in such a situation, the transmitter will need to force acknowledgements periodically to maintain a constant flow of data. Use of this feature can also eliminate the need for a delayed ACK timer, as typically used with TCP, simplifying implementations.

A flag bit for congestion marking may also be utilized in the header. The selective NAK/ACK could be implemented using option fields such as proposed for TCP. Therefore, the fields in the header of the STP packets in the present invention are aligned with the header fields of typical TCP packets. By accomplishing the header alignment, the same hardware (e.g. circuitry) may be utilized to process certain parts of both TCP and STP packets thereby decreasing the amount of circuitry from that which would be required to process STP and TCP headers separately.

Figure 3B:
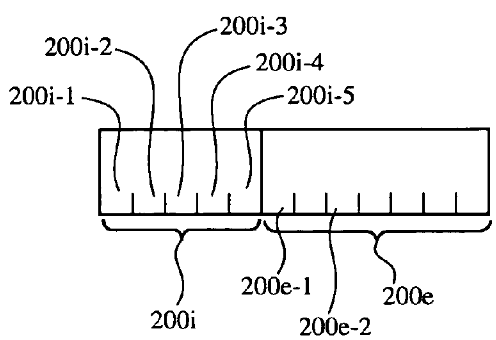
FIG. 3B shows an expanded view of a reserved data field and a flag field within an STP header in accordance with one embodiment of the present invention.

FIG. 3B shows an expanded view of a reserved data field 200*i* and a flag field 200*e* within an STP header in accordance with one embodiment of the present invention. In this embodiment, a field within the first 4 bits of the reserved field 200*i* includes a NAK field instead of the first bit in the flag field 200*e* as shown in FIG. 3A. In one embodiment, the first bit field 200*i*-5 or the fifth bit field 200*i*-1 in the reserved data field or the first bit of the flag field 200*e*-1 may be utilized for congestion control bits. It should be appreciated that one or combination of the bits 200*i*-1 through 200*i*-5 and 200*e*-1 may be utilized for congestion control marking. Therefore, any one of the fields 200*i*-1–200*i*-4 may be a NAK field within the STP header. In one embodiment, a field 200*i*-1 is a NAK field. By aligning the congestion bit field(s) in TCP and STP, more hardware can be shared between STP and TCP processing.

Figure 4:
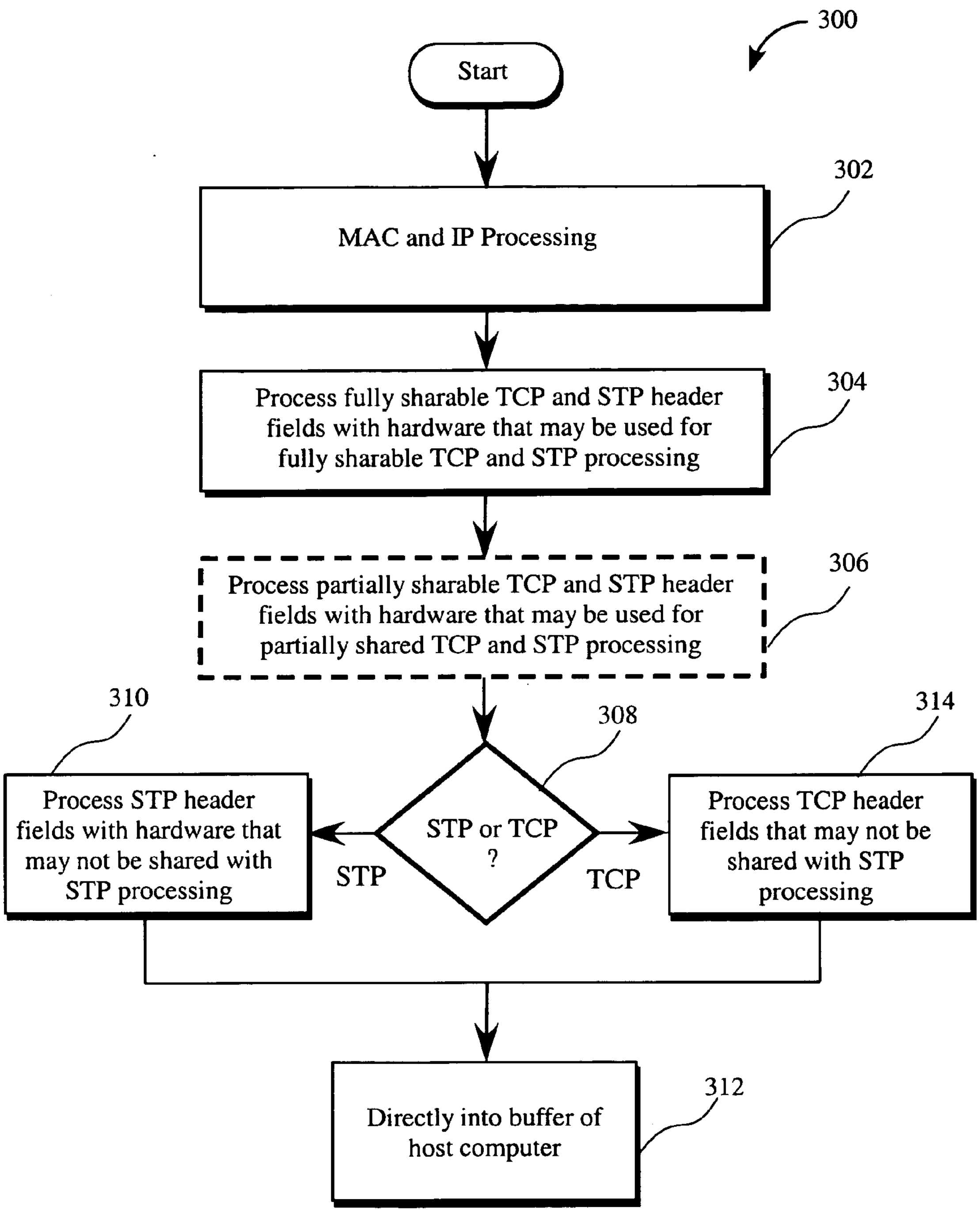
FIG. 4 shows a flow chart illustrating the data packet acceleration, identification, and management process in accordance with one embodiment of the present invention.

FIG. 4 shows a flow chart 300 illustrating the data packet acceleration, identification, and management process in accordance with one embodiment of the present invention. It should be understood that the processes depicted in the flowchart 300 (and the flowcharts 304 and 306 as discussed in reference to FIGS. 5 and 6) that are in software may be in a program instruction form written on any type of computer readable media. For instance, the program instructions can be in the form of software code developed using any suitable type of programming language. If the processes depicted are in hardware, the processes may be based in firmware, a hardware unit, or any other hardware implementations. For completeness, the process flow of FIG. 4 will illustrate an exemplary process whereby a shared hardware may process either TCP or STP headers due to the STP headers being positioned in TCP header field locations. The TCP header field locations may also be known as standard header field locations.

It should be understood that hardware as discussed herein may be any suitable circuitry that may conduct the operations as discussed herein. In one embodiment, the hardware is circuitry on a chip that may be used to accelerate data packet processing. In this embodiment, STP data processing is fully accelerated and TCP is partially accelerated by shared hardware. It should be understood that the methods described herein may have a TCP/STP shared hardware unit for fill acceleration (i.e., hardware that may be fully shared for TCP and STP) or the TCP/STP shared hardware unit may have full acceleration plus partial acceleration (i.e., hardware that may be partially shared for TCP and STP). The process begins with operation 302 where MAC processing and IP processing is conducted for incoming data packets. Operation 302 therefore conducts lower layer protocol processing. It should be appreciated that STP may or may not include IP headers and if the STP packet does not have an IP header, the IP header processing is not done. In operation 302, processes such as, for example, hardware classification can be conducted as well as checksum and CRC verification. It should be appreciated that one skilled in the art would be able to design hardware circuitry to perform MAC and IP processing. After operation 302, the lower layer protocol headers have been processed and overlying headers are shown. Overlying headers as described herein may be TCP or STP headers. Then operation 304 processes fully sharable TCP and STP header fields with hardware that may be fully shared for the processing. As used herein, the TCP and STP header fields may also be known as the overlying headers of the data packet. Operation 304 is explained in further detail in reference to FIG. 5. As used herein data within fully sharable TCP and STP header fields may also be known as fully compatible header data. After operation 304, the method advances to optional operation 306 where partially sharable TCP and STP header fields are processed with hardware that may be partially shared for the processing. Data within the partially sharable TCP and STP header fields may also be known as partially compatible header data. Operation 306 is described in further detail in reference to FIG. 6. Operation 306 may be utilized where header field locations of STP and TCP data packets are the same but where separate hardware is used for processing different types of data within the same data field locations. It should be understood that in circumstances where minimal hardware sharing is desired for TCP and STP header processing, optional operation 306 may be skipped. In such a case, the method would proceed directly from operation 304 to operation 308. If operation 306 is performed, then the method proceeds to operation 308 which determines if whether the data packet being processed is an STP data packet or a TCP data packet. If operation 308 determines that the data packet is an STP format, then the method moves to operation 310 where STP header fields not already processed by the shared hardware are processed with hardware that may not be shared with TCP processing. Hardware not shared for STP and TCP include a NAK bit (STP only), state machines for retransmit behavior, state machine for timeout behavior, and some aspects of congestion control behavior. After operation 310 the method moves to operation 312 which writes the processed data into a memory buffer of a host.

If operation 308 determines that the data packet is a TCP format, then the method moves to operation operation 314 where TCP header fields not already processed are processed. In operation 314, either hardware or software (in the host) may process the TCP header fields not already processed. In one embodiment, if software is utilized, the data packet is passed onto the host having the software for operation 314 processing. In another embodiment, if a solely TCP hardware is utilized for operation 314, the solely TCP hardware may be connected to the TCP/STP shared hardware. After operation 314, operation 312 writes the processed data into a memory buffer of the host.

Figure 5:
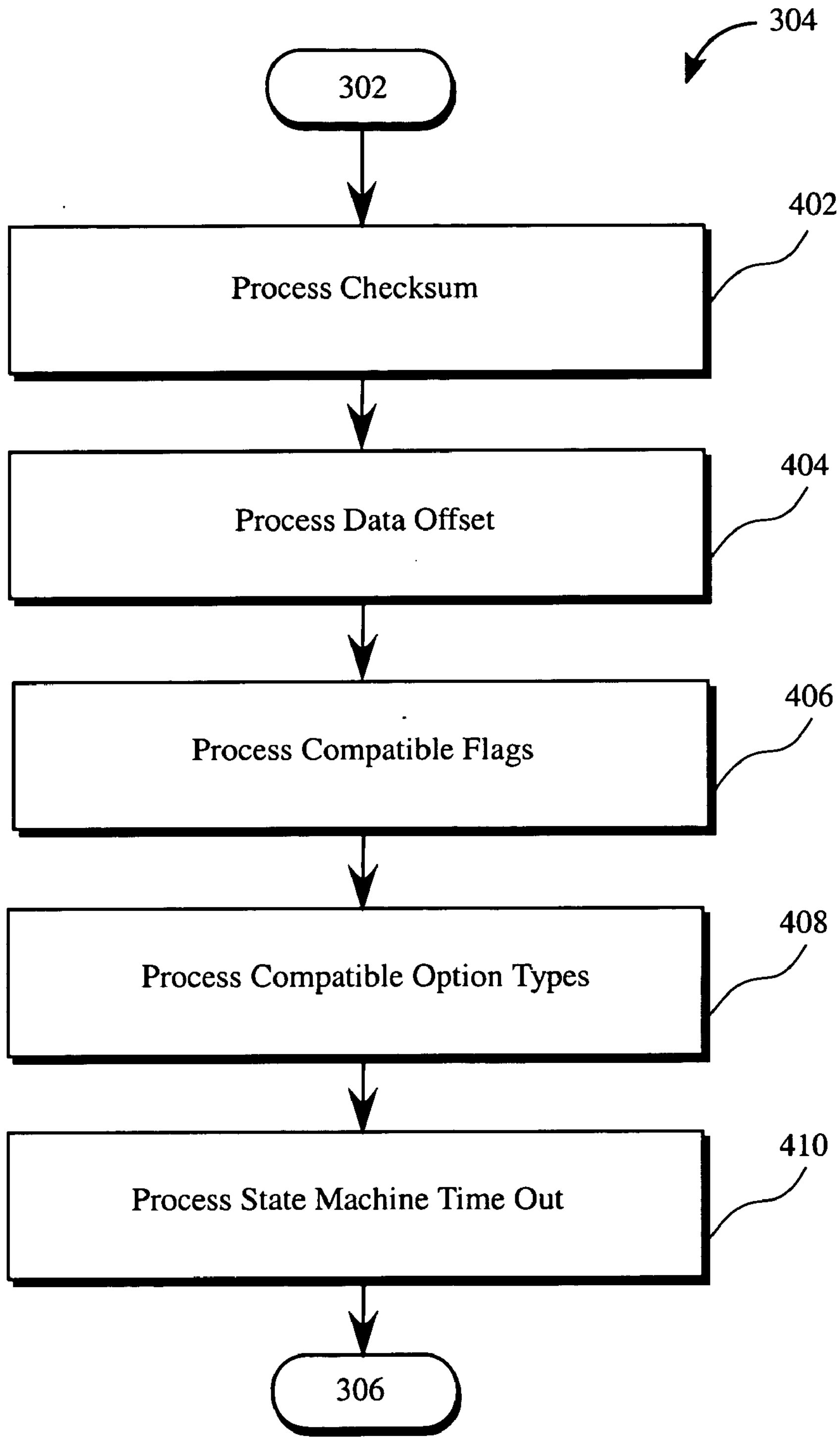
FIG. 5 defines a flowchart defining the processing of fully sharable TCP and STP header fields with hardware that may be fully shared for the processing in accordance with one embodiment of the present invention.

FIG. 5 shows a flowchart 304 that defines the processing of fully sharable TCP and STP header fields with hardware that may be fully shared for the processing in accordance with one embodiment of the present invention. It should be appreciated that operations 402, 404, 406, 408, and 410 described herein may be done in any suitable order to accommodate the type of data packet processing desired. In addition, more or less of the operations 402, 404, 406, 408, and 410 may be utilized depending on the level of alignment between STP and TCP header fields. In this embodiment, after operation 302 of the flowchart in FIG. 4, the method moves to operation 402 where information within a checksum field is processed. Checksum data may be utilized to determine if the data packet is a good data packet or a bad data packet. In one embodiment, the checksum field (which is the header field containing the checksum data) in an STP header format is aligned so the checksum data is in the location as it would be in a checksum field of a TCP header format. By aligning an STP checksum field location with a TCP checksum field location, the same hardware can be utilized to process both TCP and STP checksum data.

After operation 402, the method moves to operation 404 which processes information within a data offset field. The data offset field contains information regarding the location of where the data packet starts. The data offset field location in the STP header format may be aligned with the data offset field location in the TCP header format. Again, this alignment of STP and TCP header field enables usage of the same TCP/STP shared hardware to process data offset field information.

Then the method moves to operation 406 which processes information within compatible flag fields. In one embodiment, the compatible flag fields are RST, FIN, and SYN flags. It should be understood that other flags may be compatible depending on how much alignment between STP headers and TCP headers are desired. By having the compatible flag fields in an STP header format aligned with the TCP header format, the same hardware can process information in both the STP and TCP compatible flag fields.

After operation 406, the method moves to operation 408 which processes compatible option fields. By aligning an STP option field with a TCP option field, the same hardware can be shared for processing data within the STP option field and the TCP option field. This sharing of hardware can add flexibility in data format usage and also reduce costs by requiring less hardware than if both full TCP and STP hardware were utilized.

Then the method moves to operation 410 which processes the retransmission timer state machine time out. Again, by aligning STP and TCP data fields which contain the same type and format of data, the same hardware can be shared for processing both TCP and STP data packets. After operation 410 the method may continue with operation 306 of FIG. 4. It should be appreciated that aligning STP headers with TCP headers enables sharing of transmit side (e.g., transmitter of data packets) hardware as well as receiver side (e.g., receiver of data packets) hardware. This is the case of some hardware that spans both the receive and transmit sides. For example, the ACK field may be compared by the receiver logic against a "last ACKed" variable held in the connection state information block. If previously un-ACKed packets is ACKed, then in typical implementations, the retransmission timer is reset and, if further unacknowledged but transmitted packets exist, are restarted.

Figure 6:
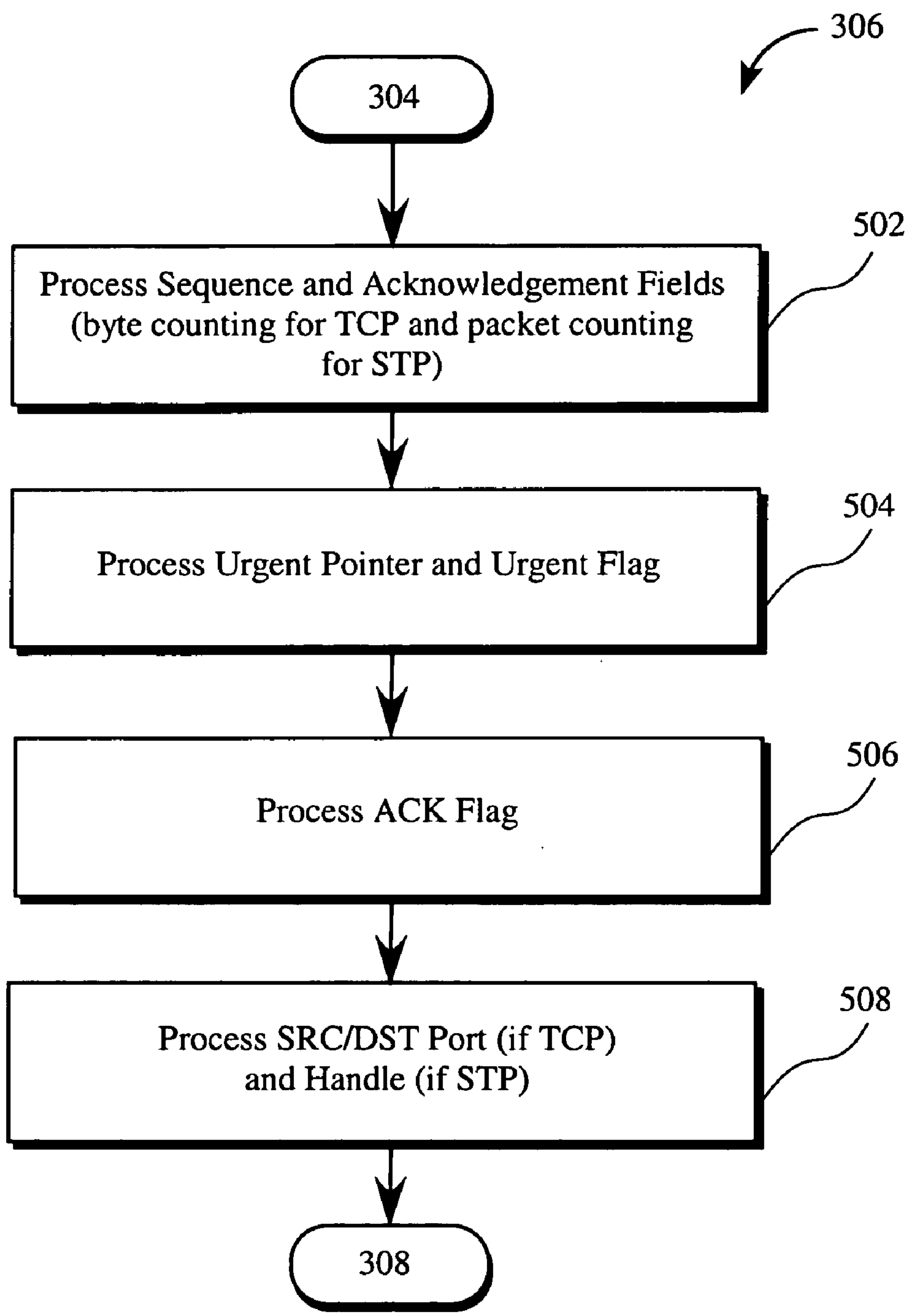
FIG. 6 illustrates a flowchart that defines the processing of partially sharable TCP and STP header fields with hardware that may be used for partially shared TCP and STP processing in accordance with one embodiment of the present invention.

FIG. 6 illustrates a flowchart 306 that defines the processing of partially sharable TCP and STP header fields with hardware that may be used for partially shared TCP and STP processing in accordance with one embodiment of the present invention. It should be appreciated that operations 502, 504, 506, and 508 described herein may be done in any suitable order to accommodate the type of data packet processing desired. In addition, more or less of the operations 502, 504, 506, and 508 may be utilized depending on the level of alignment between STP and TCP header fields. The operations of flowchart 306 include processes where hardware for processing certain STP and TCP header fields are partially shared. In one embodiment, the certain TCP and STP header fields may be in a same location (i.e., aligned) but the fields may contain different types of information or the same data may require different type of processing depending on whether a data packet is STP or TCP format. Flowchart 306 begins with operation 502 which processes sequence and acknowledgement fields (byte counting for TCP and packet counting for STP). In TCP, byte counting is utilized in data packet transmission while in STP packet counting is utilized. Therefore, although the sequence and acknowledgement fields of STP and TCP header formats may contain information relevant to similar functions, the data themselves may have to be processed in a partially different manner. Therefore, although hardware in such circumstances may partially shared and not fully shared, the partial sharing enables reduction of redundant hardware for STP and TCP data packet processing.

After operation 502, the flowchart moves to operation 504 which processes an Urgent Pointer and Urgent Flag field. Then operation 506 processes an acknowledgement (ACK) flag field. An acknowledgement number may be picked out and this is sent to a sending side of a software stack to determine if additional data packets need be sent. After operation 506, the flowchart moves to operation 508 which processes a source (SRC)/destination (DST) Port field (if TCP) and Handle field (if STP). In one embodiment, determination of which connection that is being processed for may be shared. In TCP, this is based on source and destination port numbers while in STP this is based on the handle field. Next a sequence number is compared with a sequence number in the packet to see if a packet was missed or not. Again, the header fields being processing in operations 504, 506, and 508 contain information that although not identical types or formats of information, may be sufficiently similar in type to enable partial sharing of hardware to process the information in the header fields.

Additionally, if more TCP processing is done in hardware, more hardware processing may be shared between TCP and STP. For example, some parts of congestion control fields may be processed by shared hardware. In one embodiment, a congestion encountered (CE) bit in an IP header (as marked by a switch when congestion is perceived) and a congestion seen bit (marked in a TCP/STP header by a receiving host) may be aligned in STP to match the location in a TCP header. By this way some portions of IETF's congestion control protocol processes in hardware may be at least partially shared.

The present invention may be implemented using any type of integrated circuit logic, state machines, or software driven computer-implemented operations. By way of example, a hardware description language (HDL) based design and synthesis program may be used to design the silicon-level circuitry necessary to appropriately perform the data and control operations in accordance with one embodiment of the present invention. By way of example, a VHDL® hardware description language available from IEEE of New York, N.Y. may be used to design appropriate logic circuits.

The invention may employ various computer-implemented operations involving data stored in computer systems to drive computer peripheral devices (i.e., in the form of software drivers). These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Although the foregoing invention has been described in some detail for purposes of clarity of understanding, it will be apparent that certain changes and modifications may also be practiced. Accordingly, the present embodiments are to be considered as illustrative and not restrictive, and the invention is not to be limited to the details given herein.

What is claimed is:

1. A method for processing data packets received at a computing system, the received data packets being received from a networked transmitting computing entity, the method comprising:

receiving a data packet;

processing lower layer protocol headers of the data packet to expose overlying headers of the data packet;

processing the overlying headers in a shared hardware component capable of executing header data for a transmission control protocol (TCP) communication and a storage transport protocol (STP) communication, the header data for the TCP communication and the STP communication being positioned into standard header field locations; and determining whether the data packet is from the TCP communication or the STP communication;

if the data packet is from the TCP communication, completing the processing of the overlying headers of the data packet separately in TCP processing;

if the data packet is from the STP communication, completing the processing of the overlying headers of the data packet separately in STP processing.

2. A method for processing data packets received at a computing system as recited in claim 1, wherein the header data includes, checksum data;

data offset data;

compatible flags data;

option types data; and state machine time out data.

3. A method for processing data packets received at a computing system as recited in claim 2, wherein processing the state machine time out data includes processing the state machine time out data in an additional shared hardware component used for sending the data packets.

4. A method for processing data packets received at a computing system as recited in claim 1, further comprising:

transmitting the processed data packet to a buffer of the computing system after completing the processing of the overlying headers of the data packet in the STP processing or the TCP processing.

5. A method for processing data packets received at a computing system as recited in claim 1, wherein if the data packet is from the TCP communication, the TCP processing is completed in a TCP hardware unit.

6. A method for processing data packets received at a computing system as recited in claim 1, wherein if the data packet is from the TCP communication, the TCP processing is completed by software in a host CPU of the computing system.

7. A method for processing data packets received at a computing system as recited in claim 1, wherein if the data packet is from the STP communication, the STP processing is completed in an STP hardware unit.

8. A method for processing data packets received at a computing system, the received data packets being received from a networked transmitting computing entity, the method comprising:

receiving a data packet;

processing lower layer protocol headers of the data packet to expose overlying headers of the data packet;

processing the overlying headers in a shared hardware component capable of executing fully compatible header data for a transmission control protocol (TCP) communication and a storage transport protocol (STP) communication, the fully compatible header data for the TCP communication and the STP communication being positioned into standard header field locations;

processing the overlying headers in the shared hardware component capable of executing partially compatible header data for a transmission control protocol (TCP) communication and a storage transport protocol (STP) communication, the partially compatible header data for the TCP communication and the STP communication being positioned into the standard header field locations; and determining whether the data packet is from the TCP communication or the STP communication;

if the data packet is from the TCP communication, completing the processing of the overlying headers of the data packet separately in TCP processing;

if the data packet is from the STP communication, completing the processing of the overlying headers of the data packet separately in STP processing.

9. A method for processing data packets received at a computing system as recited in claim 8, wherein the fully compatible header data includes, checksum data;

data offset data;

compatible flags data;

option types data; and state machine time out data.

10. A method for processing data packets received at a computing system as recited in claim 9, wherein processing the state machine time out data may include processing the state machine time out data in an additional shared hardware component used for sending the data packets.

11. A method for processing data packets received at a computing system as recited in claim 8, wherein the plurality compatible header data include, sequence and acknowledgement field data;

urgent pointer and urgent flag data;

acknowledgement flag data; and

SRC/DST port and handle data.

12. A method for processing data packets received at a computing system as recited in claim 8, further comprising:

transmitting the processed data packet to a buffer of the computing system after completing the processing of the overlying headers of the data packet in the STP processing or a TCP processing.

13. A method for processing data packets received at a computing system as recited in claim 8, wherein if the data packet is from the TCP communication, the TCP processing is completed in a TCP hardware unit.

14. A method for processing data packets received at a computing system as recited in claim 8, wherein if the data packet is from the TCP communication, the TCP processing is completed by software in a host CPU of the computing system.

15. A method for processing data packets received at a computing system as recited in claim 8, wherein if the data packet is from the STP communication, the STP processing is completed in an STP hardware unit.

16. A method for processing data packets received at a computing system, the received data packets being received from a networked transmitting computing entity, the method comprising:

receiving a data packet;

processing lower layer protocol headers of the data packet to expose overlying headers of the data packet;

processing the overlying headers in a shared hardware component capable of executing header data for a transmission control protocol (TCP) communication and a storage transport protocol (STP) communication, the header data for the TCP communication and the STP communication being positioned into standard header field locations; and determining whether the data packet is from the TCP communication or the STP communication;

if the data packet is from the TCP communication, completing the processing of the overlying headers of the data packet separately in TCP processing;

if the data packet is from the STP communication, completing the processing of the overlying headers of the data packet separately in STP processing; and transmitting the processed data packet to a buffer of the computing system after completing the processing of the overlying headers of the data packet in the STP processing or the TCP processing.

17. A method for processing data packets received at a computing system as recited in claim 15, wherein the header data includes, checksum data;

data offset data;

compatible flags data;

option types data; and state machine time out data.

18. A method for processing data packets received at a computing system as recited in claim 15, wherein if the data packet is from the TCP communication, the TCP processing is completed in a TCP hardware unit.

19. A method for processing data packets received at a computing system as recited in claim 15, wherein if the data packet is from the TCP communication, the TCP processing is completed by software in a host CPU.

* * * * *